No. 685,534. Patented Oct. 29, 1901.
W. SMITH.
BUCKSAW FRAME.
(Application filed Apr. 22, 1901)
(No Model.)
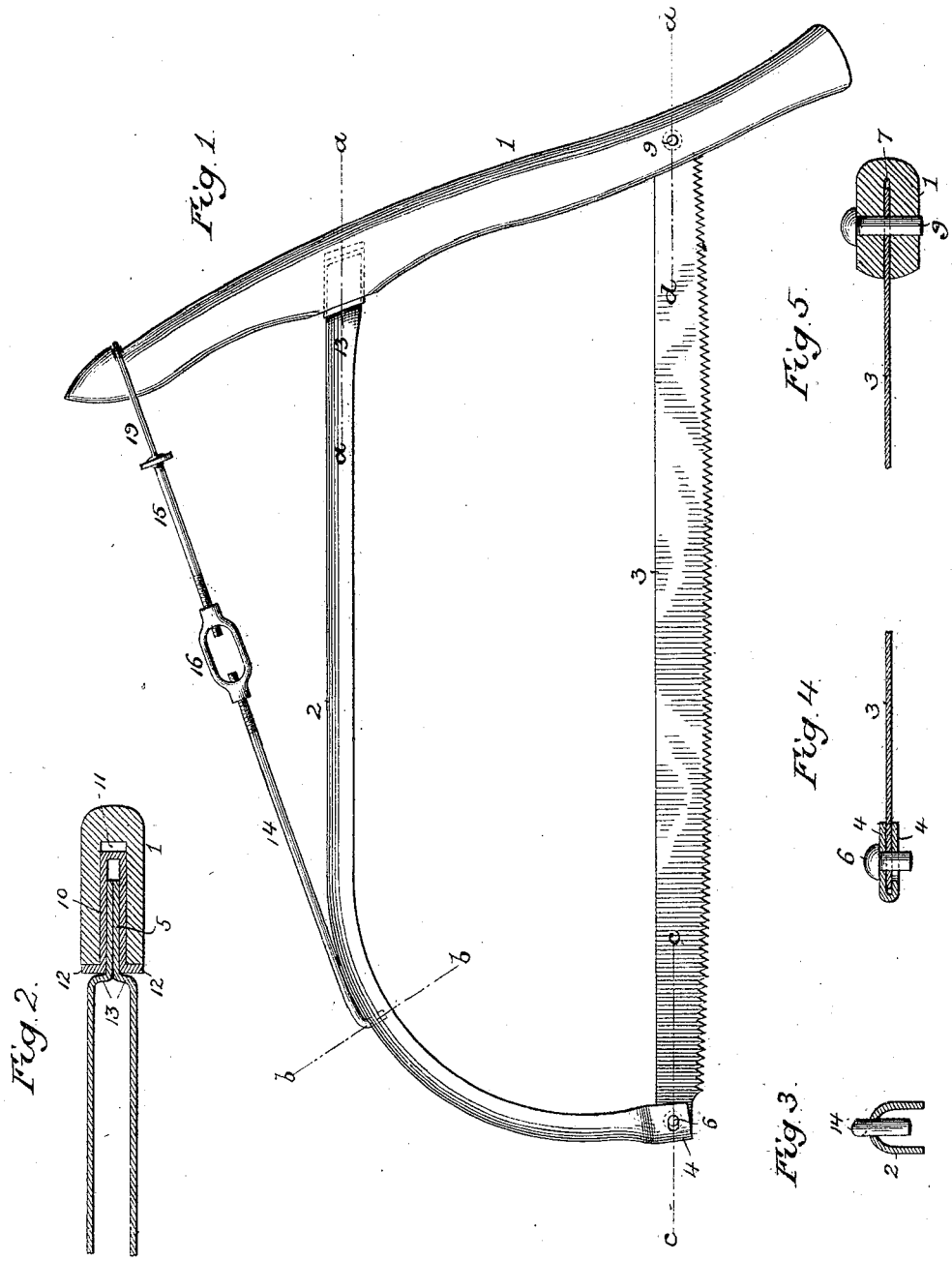
Witnesses:
Inventor:-
William Smith
by his Attorneys

UNITED STATES PATENT OFFICE.

WILLIAM SMITH, OF PHILADELPHIA, PENNSYLVANIA, ASSIGNOR TO HENRY DISSTON & SONS, INCORPORATED, OF PHILADELPHIA, PENNSYLVANIA.

BUCKSAW-FRAME.

SPECIFICATION forming part of Letters Patent No. 685,534, dated October 29, 1901.

Application filed April 22, 1901. Serial No. 56,934. (No model.)

*To all whom it may concern:*

Be it known that I, WILLIAM SMITH, a citizen of the United States, residing in Philadelphia, Pennsylvania, have invented certain Improvements in Bucksaw-Frames, of which the following is a specification.

My invention relates to that class of bucksaw-frames which comprise an upright wooden end bar or handle, a bowed metallic back frame, and a tension member extending from the outer curved end of said metallic back frame to the projecting upper end of the wooden handle, the object of my invention being to so construct a frame of this character as to cheapen its construction without any sacrifice of its strength, durability, or other desirable qualities. This object I attain in the manner hereinafter set forth, reference being had to the accompanying drawings, in which—

Figure 1 is a side view of a bucksaw with frame constructed in accordance with my invention. Fig. 2 is an enlarged sectional view on the line $a\,a$, Fig. 1. Fig. 3 is an enlarged transverse section on the line $b\,b$, Fig. 1. Fig. 4 is an enlarged section on the line $c\,c$, Fig. 1; and Fig. 5 is an enlarged section on the line $d\,d$, Fig. 1.

The upright wooden bar of the frame is represented at 1, the curved metallic back bar at 2, and the saw-blade at 3. The metallic back bar is of U shape in cross-section, open on the inner side, as shown in Fig. 3, and this bar is flattened at the opposite ends, so as to form at the lower end of the bar a pair of jaws 4 and at the upper end of the bar a tenon 5. The jaws 4 at the lower end of the bar receive between them one end of the saw-blade 3, which is secured to the jaws by means of a transverse bolt, pin, or rivet, a pin 6 being shown in Fig. 4. The opposite end of the saw-blade enters a mortise 7 in the wooden handle 1 and is secured therein by a transverse bolt, pin, or rivet, a pin 9 being shown in Fig. 5.

The tenon 5 at the upper end of the hollow metallic back bar of the frame is fitted within a socket 10, which is let into a mortise 11 in the wooden handle, and has lateral flanges 12 bearing upon the inner face of said handle and also constituting a bearing for the shoulders 13, formed by the flattening or compression of the upper end of the back bar, as shown in Fig. 2, these shoulders being preferably rounded from top to bottom, as shown in Fig. 1, so that they will not interfere with a certain amount of rocking movement of the handle upon the upper end of the back bar 2, which thus constitutes a fulcrum for said handle.

The tension member of the frame consists of a pair of rods 14 and 15, threaded at their adjoining ends for the reception of a screw-turnbuckle 16, the forward end of the lower rod 14 being hooked, as shown by dotted lines in Fig. 1, so as to enter an opening in the back of the bar 2 at the curved outer end of the same. The upper rod 15 has an ordinary swiveled yoke 19, which engages with the notched upper end of the handle 1. When, therefore, the turnbuckle 16 is tightened, the upper end of the handle is pulled forwardly and its lower end is moved rearwardly, so as to subject the saw-blade 3 to tension, the shoulders 13 of the back bar 2 serving as a fulcrum on which the handle rocks or swings.

The inverted-U form of the back bar 2 insures the maximum amount of strength for the quantity of metal employed, and the simple flattening of the ends of this bar provides the required jaws for attachment to the saw-blade and tenon for engagement with the handle, the employment of the flanged socket 10 insuring an extended bearing-surface against the inner face of the handle and preventing wear of said handle, such as might be caused by pressure against and rocking movement on the shoulders 13 of the back bar, which would take place in the absence of the socket. In cases where this objection is not material, however, the use of the socket may be dispensed with.

A saw-frame constructed in the manner above described combines the elements of cheapness, strength, and durability and provides for the ready assembling or taking apart of the members of the frame and for the quick tightening or slackening of the blade by a simple movement of the turnbuckle 16.

Having thus described my invention, I claim and desire to secure by Letters Patent—

A bucksaw-frame comprising an upright wooden handle, a curved metallic back bar of inverted-U shape in cross-section, and having flattened ends forming jaws at the outer end of the bar, and a tenon at the upper end of the same, a saw-blade connected to the handle at one end and to said jaws at the opposite end, and a tension member extending from the curved outer end of the back bar to the projecting upper end of the handle and serving to press the tenon at the upper end of the back bar into a mortise in the upright handle, substantially as specified.

In testimony whereof I have signed my name to this specification in the presence of two subscribing witnesses.

WILLIAM SMITH.

Witnesses:
E. R. ROBERTS,
CHARLES Q. MACDONOUGH.